(12) United States Patent
Schneider et al.

(10) Patent No.: US 11,865,991 B1
(45) Date of Patent: Jan. 9, 2024

(54) OVERHEAD AIRBAG CUSHIONS AND RELATED SYSTEMS

(71) Applicant: Autoliv ASP, Inc., Ogden, UT (US)

(72) Inventors: David W. Schneider, Waterford, MI (US); Frank J. Herzenstiel, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/879,656

(22) Filed: Aug. 2, 2022

(51) Int. Cl.
| | |
|---|---|
| *B60R 21/214* | (2011.01) |
| *B60R 21/231* | (2011.01) |
| *B60R 21/239* | (2006.01) |

(52) U.S. Cl.
CPC .......... *B60R 21/214* (2013.01); *B60R 21/231* (2013.01); *B60R 21/239* (2013.01); *B60R 2021/23107* (2013.01); *B60R 2021/23192* (2013.01)

(58) Field of Classification Search
CPC ........ B60R 21/214; B60R 2021/23192; B60R 2021/23107; B60R 21/206; B60R 2021/23382; B60R 21/239; B60R 21/233; B60R 21/2338; B60R 21/23382
See application file for complete search history.

(56) References Cited

U.S. PATENT DOCUMENTS

| | | |
|---|---|---|
| 9,446,735 B1 | 9/2016 | Jayasuriya et al. |
| 10,266,145 B2 | 4/2019 | Paxton et al. |
| 2017/0113646 A1* | 4/2017 | Lee ...................... B60R 21/2338 |
| 2019/0161048 A1* | 5/2019 | Thomas ................ B60R 21/264 |
| 2019/0337478 A1* | 11/2019 | Schneider ............. B60R 21/214 |
| 2020/0307495 A1* | 10/2020 | Jimenez ................ B60R 21/232 |
| 2020/0361410 A1* | 11/2020 | Jayakar ................. B60R 21/214 |
| 2020/0377052 A1* | 12/2020 | Youssef-Agha ...... B60R 21/231 |
| 2021/0009072 A1* | 1/2021 | Hwangbo ......... B60R 21/01512 |
| 2021/0031718 A1* | 2/2021 | Schultz ................ B60R 21/231 |
| 2021/0101559 A1* | 4/2021 | Fischer ............... B60R 21/2338 |
| 2021/0179005 A1* | 6/2021 | Jayakar ................... B60R 21/01 |
| 2021/0268986 A1* | 9/2021 | Gould ................... B60R 21/214 |
| 2021/0387591 A1* | 12/2021 | Choi .................... B60R 21/2338 |
| 2021/0394697 A1* | 12/2021 | Faruque .............. B60R 21/2338 |
| 2022/0017036 A1* | 1/2022 | Jeong .................... B60R 21/214 |

FOREIGN PATENT DOCUMENTS

| | | | | |
|---|---|---|---|---|
| EP | 3 483 012 A1 | 5/2019 | | |
| EP | 3483012 A1 * | 5/2019 | ........... | B60R 21/214 |

* cited by examiner

*Primary Examiner* — Paul N Dickson
*Assistant Examiner* — Matthew Joseph Ganci
(74) *Attorney, Agent, or Firm* — Foley & Lardner LLP

(57) ABSTRACT

Overhead airbag cushions are disclosed suitable for installation to a vehicle having an alternative seating arrangement, e.g., "campfire" or "living room" style seating wherein vehicle seating positions face each other. The overhead airbag cushion deploys from above a vehicle seating position to be disposed to receive at least a head of an occupant of the vehicle seating position. A reaction surface of the overhead airbag cushion may engage a roof, a windshield, or other structure of the vehicle to limit deflection of the overhead airbag cushion during loading as the occupant impacts the overhead airbag cushion. Internal and/or external tethers may assist in positioning and supporting the overhead airbag cushion.

19 Claims, 6 Drawing Sheets

OVERHEAD AIRBAG CUSHIONS AND RELATED SYSTEMS

TECHNICAL FIELD

The present disclosure relates generally to the field of automotive protection systems for vehicle occupants. More particularly, the present disclosure relates to airbag assemblies, such as inflatable overhead airbag assemblies mounted to a roof of a vehicle and configured to deploy in response to a collision event.

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
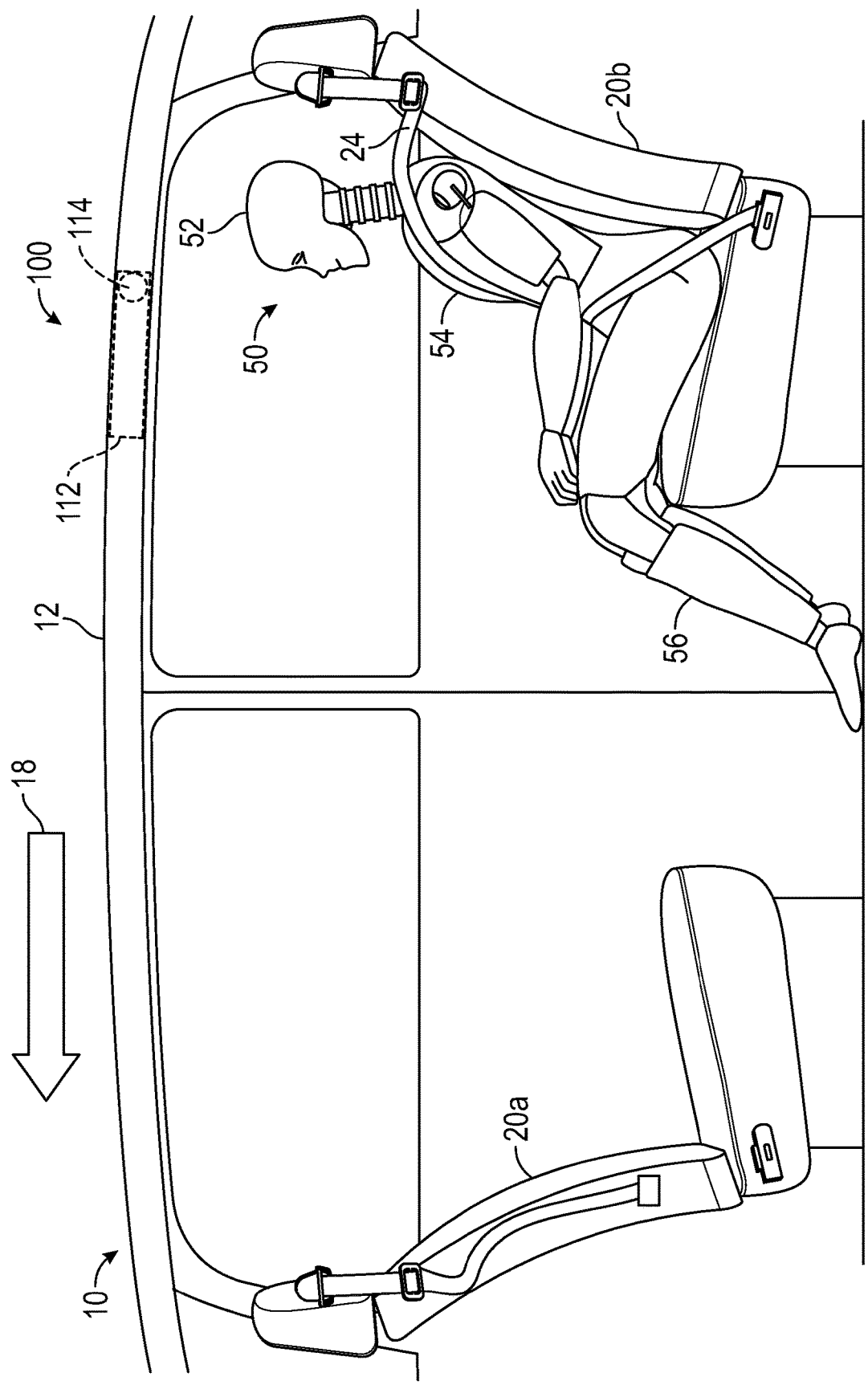
FIG. 1 is a side view of a portion of an interior of a vehicle having an alternative seating arrangement and equipped with an overhead airbag cushion system according to one embodiment of the present disclosure.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Airbag cushions currently employed for automotive occupant protection are useful in limited vehicle seating arrangements, e.g., for occupants seated in forward facing seats. As automotive technology evolves, other vehicle seating arrangements become possible and even desirable. An example of an alternative to forward facing occupants is so-called campfire seating, or living room seating, in which vehicle seating positions are disposed facing each other. In such a setting, some of the vehicle seating positions face forward and complementary vehicle seating positions face rearward. Presently available airbag assemblies suffer major shortfalls in such alternative seating arrangements.

Campfire seating presents a challenge to protect both a forward facing occupant and a rear facing occupant from occupant-on-occupant impact during a collision event, as well as limiting injuries from uncontrolled deceleration of an occupant, and injury resulting from an occupant impacting a portion of an occupant's own body, as well as neck injury. The present disclosure provides systems and methods of deploying an overhead mounted airbag in an alternative seating arrangement to reduce or limit such injuries during a collision event.

Occupant protection systems, such as airbag cushions, are widely used to prevent or reduce occupant injury during a collision event. Airbags may be installed at various locations within a vehicle, including, but not limited to, a steering wheel, a dashboard/instrument panel, within a side door or a side of a seat, adjacent to a roof rail, etc. In the following disclosure, "airbag cushion" generally refers to an inflatable airbag, such as, for example, a passenger airbag that is typically housed in a vehicle structure forward or rearward of a vehicle seating position, although the principles discussed herein may apply to other types of airbags (e.g., airbags mounted above a vehicle seating position, door-mounted airbags, knee airbags, etc.). In the following disclosure, reference is particularly made to airbags that are designed to deploy above a vehicle seating position.

During installation, the disclosed airbags are typically disposed in an interior of a housing in a packaged state (e.g., rolled, folded, and/or otherwise compressed) or a compact configuration and may be retained in the packaged state behind a cover. In some embodiments, the disclosed airbags may be packaged in a "soft pack" without a rigid housing, and would instead use the vehicle structure as the reaction surface. During a collision event, an inflator may be triggered, which rapidly fills the airbag cushion with inflation gas. The inflation gas may cause the airbag cushion to rapidly transition from a compact packaged (i.e., an undeployed) state to an expanded or deployed state. For example, the expanding airbag may open an airbag cover (e.g., by tearing through a burst seam or opening a door-like structure) to exit the housing. The inflator may be triggered by any suitable device or system, and the triggering may be in response to and/or influenced by one or more vehicle sensors.

Some embodiments of airbag cushions disclosed herein may be particularly well-suited for cushioning an occupant seated in an alternative seating arrangement (e.g., campfire-style or living room-style seating) of a vehicle, and may be mounted to a roof of the vehicle above the particular vehicle seating position occupied by such an occupant. An airbag cushion can mitigate injury to an occupant of a vehicle during a collision event by reducing the effect of impact of the occupant against structures (body-structure impact) within the vehicle, impact of the occupant against another occupant (occupant-occupant impact), etc.

Some embodiments of the present disclosure can provide improved positioning, cushioning, and/or safety to an occupant of a forward facing vehicle seating position, and in particular for an occupant of such a vehicle seating position in an alternative seating arrangement.

The components of the embodiments as generally described herein and illustrated in the accompanying figures may be arranged and designed in a wide variety of different configurations. The following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

As used herein, the terms "connect" and "couple" are used in their ordinary sense, and are broad enough to refer to any suitable coupling or other form of interaction between two or more entities, including mechanical and fluid interaction. Two components may be coupled to each other even though they are not in direct contact with each other.

As used herein, the terms "forward" and "rearward" are used with reference to the front and back of the relevant vehicle. For example, a forward door may be nearer the front of the vehicle than another door, and a rearward door may be nearer the back of the vehicle than another door.

As used herein, the terms "proximal" and "distal" refer to generally opposite locations on an airbag cushion or a component of an airbag assembly. The proximal end of an airbag cushion is the end of the airbag cushion that is closest to the inflator when the airbag is at least substantially inflated. The distal end of the airbag cushion is the end opposite the proximal end of the airbag cushion. In other words, the terms "proximal" and "distal" are with reference to a point of attachment, such as a point of attachment of the airbag cushion at an airbag housing and a point of attachment of a housing to a vehicle structure, e.g., a vehicle roof, a seat, etc., from which the airbag deploys. "Proximal" is situated at, near, or toward the point of attachment and "distal" is situated away from the point of attachment.

As used herein, the term "vehicle seating position" refers to a location within a cabin of a vehicle configured for or otherwise intended to be occupied by an occupant.

As used herein, the term "seat" refers to a structure within a cabin of a vehicle disposed at a vehicle seating position and installed such that an occupant may be seated thereon/therein for transport within the vehicle.

As used herein, the terms "alternative seating arrangement," "campfire seating," and "living room seating" each refers to an arrangement of vehicle seating positions and/or seats wherein at least two vehicle seating positions are oriented such that occupants of the at least two vehicle seating positions may be seated facing each other. For instance, a forwardly disposed vehicle seating position may be oriented such that an occupant of the vehicle seating position faces rearward toward another vehicle seating position.

As used herein, the term "vehicle" may refer to any vehicle, such as an automobile, a light truck, a truck, a utility vehicle, a bus, an airplane, a watercraft, etc.

As used herein, the term "occupant" generally refers to a person within a vehicle. The term "occupant" is broad enough to include a crash test dummy within a vehicle.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 is a side view of a portion of an interior of a vehicle 10 having an alternative seating arrangement and equipped with an overhead airbag cushion system 100, according to an embodiment of the present disclosure. A vehicle forward direction 18 is indicated. A first vehicle seating position 20a is disposed forward of a second vehicle seating position 20b. The first vehicle seating position 20a faces rearward and the second vehicle seating position 20b faces forward. An occupant 50 is shown in the second vehicle seating position 20b. A safety belt 24 may be in position engaging the occupant 50. A head 52, a torso 54, and a lower body 56 of the occupant 50 are shown for reference. While not shown, one or more occupants may be seated in the same row as the second vehicle seating position 20b. In addition, while not shown, the first vehicle seating position 20a may have one or more occupants in the same row as the first vehicle seating position 20a. This overhead airbag cushion system 100 may be designed to provide protection to a single occupant, or alternatively, to multiple occupants in the same row or in the opposite-facing row.

The overhead airbag cushion system 100 comprises a housing 112 and an inflator 114 disposed within the housing 112. The housing 112 may house an overhead airbag cushion (see the overhead airbag cushion 120 in FIG. 2A) in a packaged, undeployed folded, compact, or compressed state. The housing 112 is disposed at the roof 12 of the vehicle 10 so as to be substantially above the second vehicle seating position 20b. For ease of illustration, only the overhead airbag cushion system 100 is illustrated in the FIGS. 1-6. However, another overhead airbag cushion system may be disposed laterally relative to the overhead airbag cushion system 100 to deploy in front of another seat in the same row of seats as the second vehicle seating position. In addition, one or more overhead airbag cushion systems may be disposed substantially above the first vehicle seating position 20a to accommodate multiple seats in the same row as the first vehicle seating position 20a.

Figure 2A:
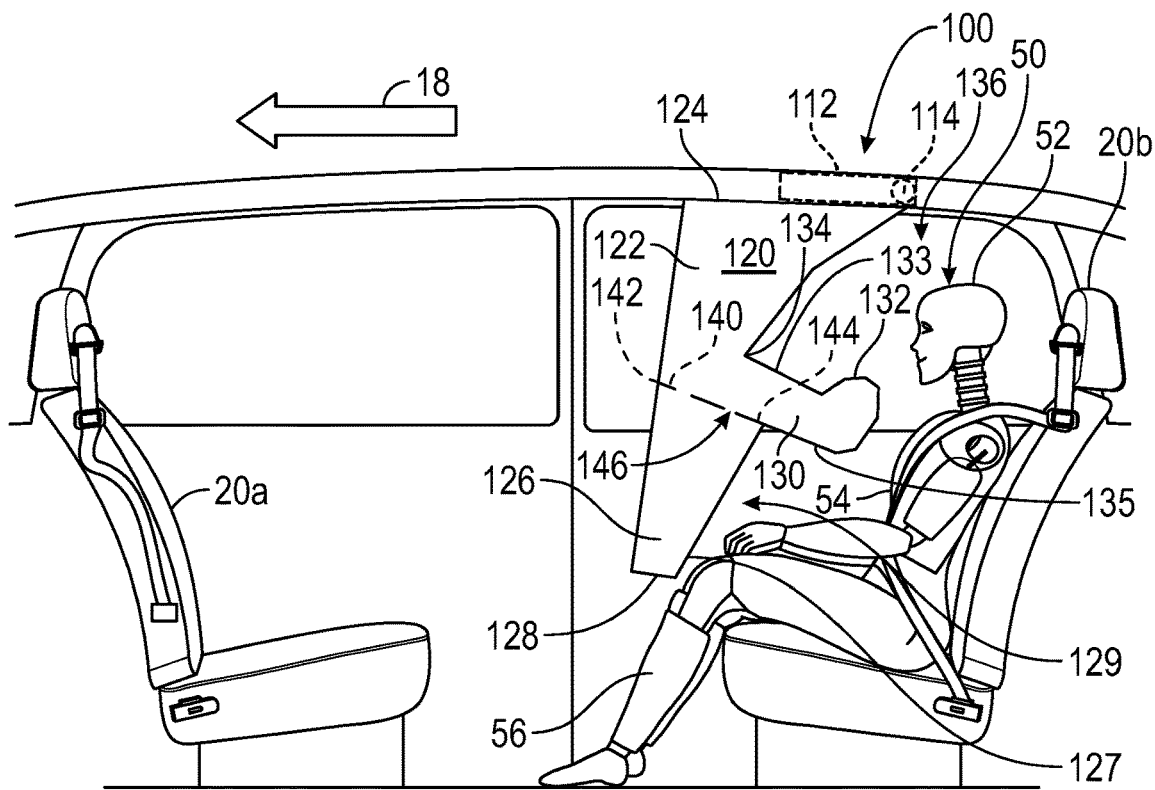
FIG. 2A is a side view of a portion of the interior of the vehicle having the overhead airbag cushion system of FIG. 1 with an overhead airbag cushion at least partially inflated and deployed from a housing.

FIG. 2A is a side view of a portion of the interior of the vehicle 10 having the overhead airbag cushion system 100 of FIG. 1 with an overhead airbag cushion 120 at least partially inflated and deployed from the housing 112. The vehicle forward direction 18, the roof 12, and the first and second vehicle seating positions 20a, 20b are identified for reference, as are the occupant 50, the head 52, the torso 54, and the lower body 56 of the occupant 50. An overhead airbag cushion 120 is shown at least partially deployed from the housing 112 substantially above the second vehicle seating position 20b and forward of a seatback of the second vehicle seating position 20b.

The overhead airbag cushion 120 may be formed of a flexible fabric-like material and may be folded, compressed, or otherwise manipulated to dispose the overhead airbag cushion 120 at least partially within the housing 112 during assembly. The overhead airbag cushion 120 may be in fluid communication with the inflator 114 to provide inflation gas from the inflator 114 to an interior portion of the overhead airbag cushion 120. In response to a triggering event, e.g., a collision event, the inflator 114 may be activated to generate inflation gas and the inflation gas may flow into the overhead airbag cushion 120 to cause the overhead airbag cushion 120 to expand and deploy from the housing 112.

As illustrated in FIG. 2A, the overhead airbag cushion 120 has been at least partially inflated by the inflator 114. The overhead airbag cushion 120 comprises a main chamber 122, a lower chamber 126, and an elongate head chamber (extension chamber) 130. The main chamber 122 is configured to receive inflation gas from the inflator 114 to expand from a packaged state above the second vehicle seating position 20b and deploy forward and downward to be disposed forward of the second vehicle seating position 20b in a deployed state. The main chamber 122 of the overhead airbag cushion 120 comprises a reaction surface 124 to engage a vehicle structure, e.g., the roof 12. The reaction surface 124 is disposed adjacent to the vehicle structure, e.g., the roof 12. The lower chamber 126 comprises a distal end 128 deployed downward from the roof 12.

The extension chamber 130 is disposed between the main chamber 122 and the lower chamber 126. The extension chamber 130 extends rearward from the main chamber 122 and the lower chamber 126 toward the second vehicle seating position 20b. The extension chamber 130 may comprise an upward projection 132 at or near a free end of the extension chamber 130. The extension chamber 130 defines a rearward surface 134 to receive the occupant 50 seated at the second vehicle seating position 20b. Said otherwise, the main chamber 122 and the extension chamber 130 define a cavity 136 to receive a head of the occupant 50 seated at the second vehicle seating position 20b during a collision event. The extension chamber 130 extends from the main chamber 122 toward the second vehicle seating position 20b at an angle relative to the main chamber 122, the extension chamber 130 defining an upper occupant loading (or impact) surface 133 configured to, in a collision event, receive the head 52 of the occupant 50 seated in the second vehicle seating position 20b.

The overhead airbag cushion 120 further comprises an internal tether 140 that extends from an occupant facing portion of the main chamber 122 to a vehicle facing portion of the main chamber 122. In other words, a first end 142 of the internal tether 140 may be coupled at a vehicle facing portion of the main chamber 122 and a second end 144 of the internal tether 140 may be coupled at an occupant facing portion of the main chamber 122. The internal tether 140 may be configured to assist in disposing the overhead airbag cushion 120 forward of the occupant 50 at the second vehicle seating position 20b to receive the occupant 50 and, more particularly, the head 52 of the occupant 50 during a collision event. The internal tether 140 may comprise one or more vents 146 to permit inflation gas to enter the lower chamber 126. The vents 146 of the internal tether 140 may be particularly configured, e.g., by shape, size, number of vents, etc.) to regulate a degree of inflation of the lower chamber 126 relative to a degree of inflation of the main chamber 122, or as a matter of inflation timing relative to inflation of the main chamber 122. A rearward surface 127 of the lower chamber 126 and a bottom surface 135 of the extension chamber 130 define a cavity 129 to receive the lower body 56 of the occupant 50, in particular for an occupant 50 who is unrestrained or partially unrestrained. In some embodiment, the rearward surface 127 of the lower chamber may also act as a restraint for any loose objects on a lap of the occupant 50 that may be propelled forward during a collision, such as a laptop, book, etc., to prevent the item from being propelled throughout the interior of the vehicle 10.

As discussed above, an overhead airbag cushion system that is disposed substantially above the first vehicle seating position 20a may have a similar structure as the overhead airbag cushion 120 but the structure is mirrored to engage with an occupant in the first vehicle seating position 20a. The deployment trajectory of the overhead airbag cushion of the overhead airbag cushion system above the first vehicle seating position 20a would be downward are rearward.

Figure 2B:
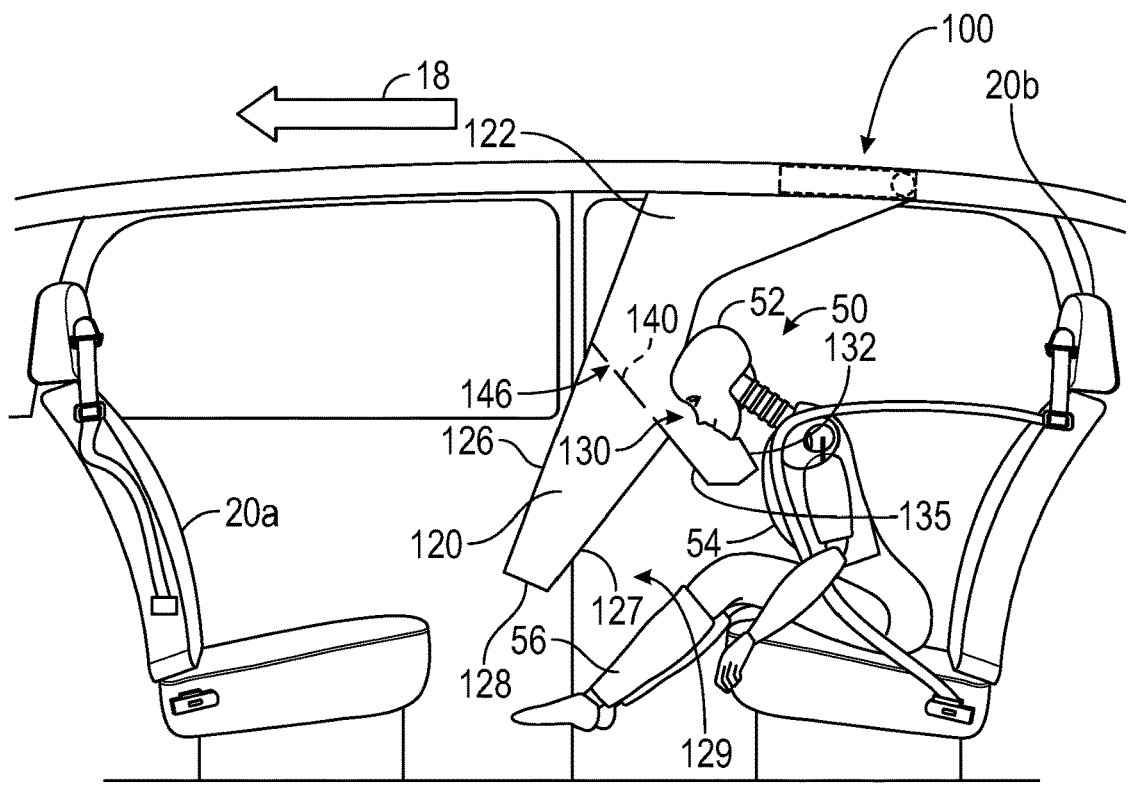
FIG. 2B is a side view of a portion of the interior of the vehicle having the overhead airbag cushion system of FIG. 1 with the occupant engaging the deployed overhead airbag cushion.

FIG. 2B is a side view of a portion of the interior of the vehicle 10 having the overhead airbag cushion system 100 of FIGS. 1 and 2A with the occupant 50 engaging the overhead airbag cushion 120. The vehicle forward direction 18, first and second vehicle seating positions 20a, 20b, and the roof 12 of the vehicle 10 are shown for reference, as are the main chamber 122, the lower chamber 126, the extension chamber 130, and the internal tether 140 of the overhead airbag cushion 120. As a result of a collision event, the head 52 of the occupant 50 has contacted the overhead airbag cushion 120 causing the extension chamber 130 to deflect vertically relative to the main chamber 122 when the head 52 of the occupant 50 engages the extension chamber 130 thereby changing the angle between the extension chamber 130 and the main chamber 122. In the illustrated embodiment of FIG. 2B, the extension chamber 130 deflects vertically downward. Alternatively, the extension chamber 130 may deflect upward depending upon the occupant contact location and angle of impact by the occupant.

The overhead airbag cushion 120 is restricted as to a degree of forward movement (e.g., vertical rotational movement about a y-axis of the vehicle 10) by the reaction surface 124 of the main chamber 122 pressing against the roof 12 of the vehicle. The reaction surface 124 engages the roof 12 of the vehicle 10 to reduce the potential of rotation of the main chamber 122 around a y-axis of the vehicle 10 in which the overhead airbag cushion 120 is mounted.

Forward and downward rotation (e.g., vertical rotational movement about a y-axis of the vehicle) of the extension chamber 130 is similarly limited. Limitation of forward and downward (y-axis rotational) movement of the overhead airbag cushion 120 and, more particularly, of the extension chamber 130, may reduce or mitigate injury to the occupant 50. Furthermore, in an event wherein a facing occupant is disposed at the first vehicle seating position 20a, the overhead airbag cushion 120 may afford a substantial degree of protection of both occupants 50 from occupant-on-occupant interaction during a collision event.

Figure 3:
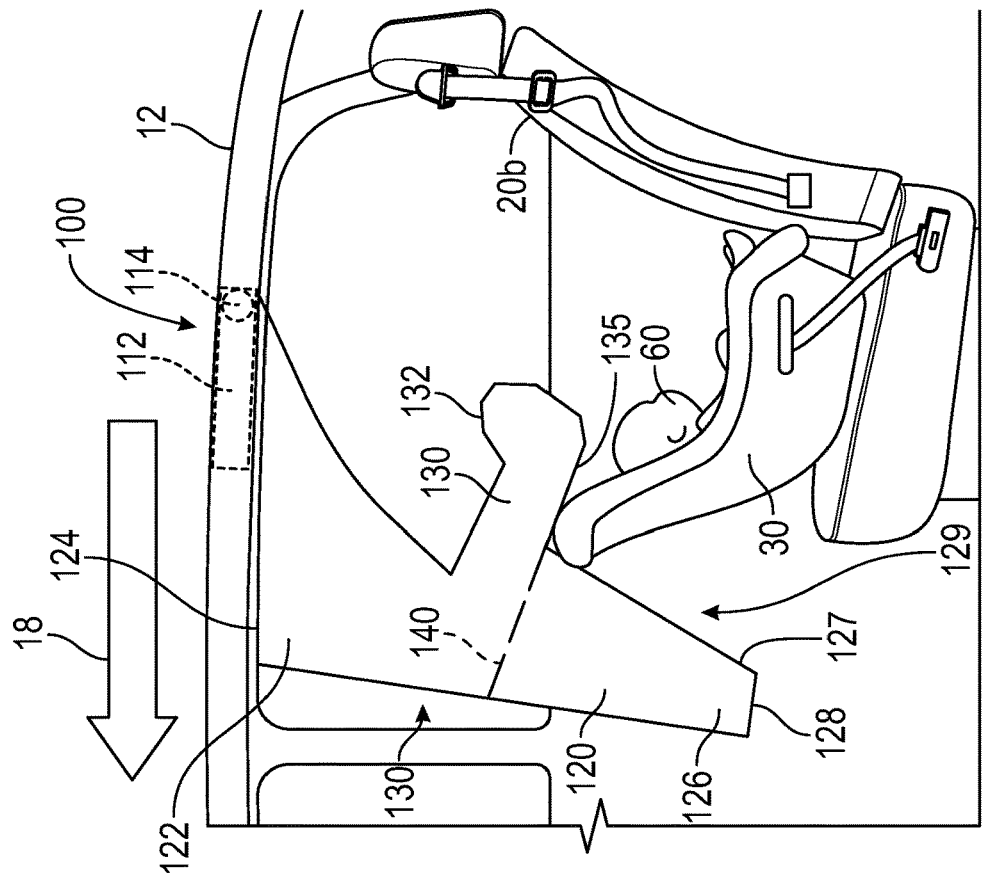
FIG. 3 is a side view of a portion of the interior of the vehicle having the overhead airbag cushion system of FIG. 1 engaging a rear-facing infant child seat.

FIG. 3 is a side view of a portion of the interior of the vehicle 10 having the overhead airbag cushion system 100 with an infant 60 in a rearward facing infant car seat 30 (a child safety seat) in the second vehicle seating position 20b. The roof 12, the vehicle forward direction 18, and the second vehicle seating position 20b are identified for reference, as are the housing 112 and the inflator 114 of the overhead airbag cushion system 100.

The overhead airbag cushion 120 has been deployed from the housing 112 and is at least partially inflated. The main chamber 122, the lower chamber 126, the distal end 128, and the internal tether 140 are identified for reference. The lower chamber 126 defines the rearward surface 127 to receive the rearward facing infant car seat 30. The extension chamber 130 defines the bottom surface 135 to receive the rearward facing infant car seat 30. Said otherwise, the lower chamber 126 and the extension chamber 130 provide the cavity 129 of the overhead airbag cushion 120 to engage the rearward facing infant car seat 30 and may help retain (or assist in retaining) the rearward facing infant car seat 30 at the second vehicle seating position 20b during a collision event. The overhead airbag cushion 120 may provide protection for the infant from other occupants and/or debris from the collision.

Figure 4:
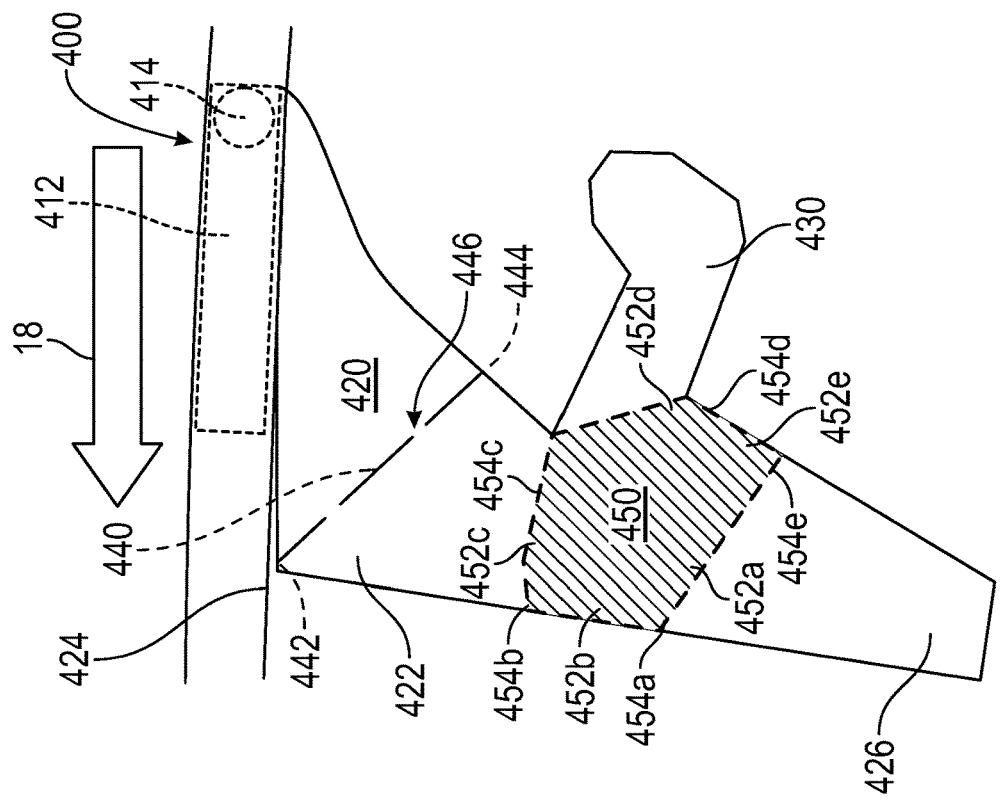
FIG. 4 is a detailed side view of a portion of an interior of a vehicle equipped with an overhead airbag cushion system having a vertical internal tether according to one embodiment of the present disclosure.

FIG. 4 depicts an embodiment of an overhead airbag cushion system 400 that resembles the overhead airbag cushion system 100 described above in certain respects. Accordingly, like features are designated with like reference numerals, with the leading digit(s) incremented to "4." For example, the embodiment depicted in FIG. 4 includes an overhead airbag cushion 420 that may, in some respects, resemble the overhead airbag cushion 120 of FIGS. 1-3. Relevant disclosure set forth above regarding similarly identified features thus may not be repeated hereafter. Moreover, specific features of the overhead airbag cushion 120 and related components shown in FIGS. 1-3 may not be shown or identified by a reference numeral in the drawings or specifically discussed in the written description that follows; however, such features may clearly be the same, or substantially the same, as features depicted in other embodiments and/or described with respect to such embodiments. Accordingly, the relevant descriptions of such features apply equally to the features of the overhead airbag cushion 420 and related components depicted in FIG. 4. Any suitable combination of the features, and variation of the same, described with respect to the overhead airbag cushion 120 and related components illustrated in FIGS. 1-3 can be employed with the overhead airbag cushion 420 and related components of FIG. 4, and vice versa. This pattern of disclosure applies equally to further embodiments depicted in subsequent figures and described hereafter, wherein the leading digits may be further incremented.

FIG. 4 is a detailed side view of a portion of an interior of a vehicle 10 equipped with the overhead airbag cushion system 400 having a vertical internal panel tether 450. The vehicle forward direction 18 is indicated. The overhead airbag cushion system 400 comprises a housing 412, an inflator 414 at least partially disposed within the housing 412, and an overhead airbag cushion 420 in fluid communication with the inflator 414. The housing 412 is disposed at the roof 12 of the vehicle 10. The overhead airbag cushion 420 comprises a main chamber 422, a lower chamber 426, and an extension chamber 430. A reaction surface 424 of the overhead airbag cushion 420, in a deployed state, is disposed adjacent a portion of the roof 12. The overhead airbag cushion 420 also comprises an internal tether 440. The internal tether 440 has a first end 442 coupled at a vehicle facing portion of the overhead airbag cushion 420, and a second end 444 coupled at an occupant facing portion of the overhead airbag cushion 420. In one embodiment, the internal tether 440 may be a strap-like tether. In one embodiment, there may be a plurality of internal tethers 440 disposed at lateral intervals across the main chamber 422. In one embodiment, the internal tether 440 may be a panel-like tether, and may be configured with one or more orifices 446 to permit inflation gas to pass through the internal tether 440.

The overhead airbag cushion 420 further comprises the vertical internal panel tether 450. The vertical internal panel tether 450 may take the form of a panel manufactured of the same or a similar material as the overhead airbag cushion 420. The vertical internal panel tether 450 may comprise a series of edges 452a, 452b, 452c, 452d, and 452e, and a plurality of corners 454a, 454b, 454c, 454d, and 454e. The corners 454a-454e may each couple to an interior portion of the overhead airbag cushion 420. In the example of FIG. 4 and with respect to inner surfaces and spaces (or voids) of the overhead airbag cushion 420: the corner 454a couples to a vehicle-forward inner surface of the main chamber 422; the edge 452a spans a void between the vehicle-forward inner surface of the main chamber 422 and a vehicle-rearward inner surface of the main chamber 422; the corner 454b couples to an inner surface of the overhead airbag cushion 420 at or near an intersection of the vehicle-rearward inner surface of the main chamber 422 and an upper inner surface of the extension chamber 430; the edge 452b spans a void between the upper inner surface of the extension chamber 430 and a lower inner surface of the extension chamber; the corner 454c couples to the overhead airbag cushion 420 at or near an intersection of a vehicle-rearward inner surface of the lower chamber 426 and the lower inner surface of the extension chamber 430; the edge 452c traverses generally downward along the vehicle-rearward inner surface of the lower chamber 426; the corner 454d couples to the vehicle-rearward inner surface of the lower chamber 426 at a location generally downward from the corner 454c; the edge 452d spans a void between the vehicle-rearward inner surface of the lower chamber 426 and a vehicle-forward inner surface of the lower chamber 426; the corner 454e couples to the vehicle-forward inner surface of the lower chamber 426; and the edge 452e traverses generally upward to return to the corner 454a. The vertical internal panel tether 450 may comprise a plurality of flow apertures or vents to regulate a degree of inflation of the overhead airbag cushion 420. The vertical internal panel tether 450 may also traverse laterally across the width of the overhead airbag cushion 420.

In one embodiment, there may be a plurality of vertical internal panel tethers 450 disposed at lateral intervals across the overhead airbag cushion 420. The internal tethers 440, 450 may assist in positioning the overhead airbag cushion 420 during deployment in a collision event. In one embodiment, the internal tethers 440, the vertical internal panel tether 450, or both may assist in controlling a rate of inflation or expansion of the overhead airbag cushion 420. The internal tether 440 and the vertical internal panel tether 450 may control the geometry of the overhead airbag cushion 420 during deployment and may reduce the inflated volume of the overhead airbag cushion 420.

Figure 5:
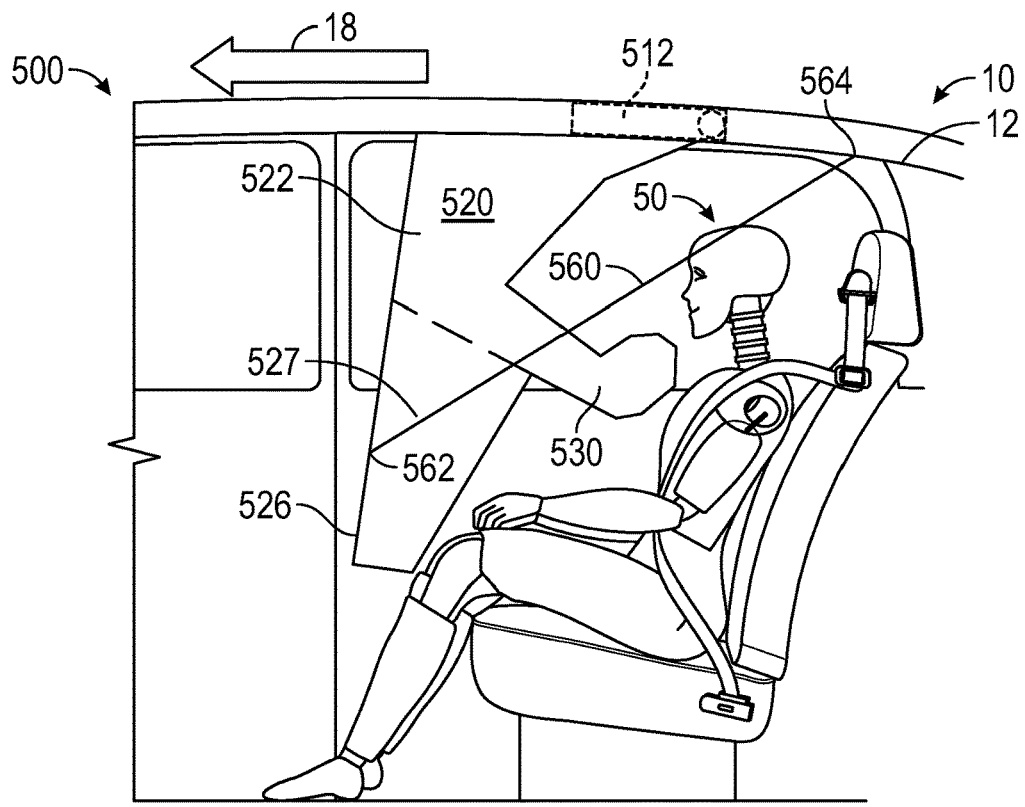
FIG. 5 is a side view of a portion of an interior of a vehicle equipped with an overhead airbag cushion system having a pair of external tethers according to one embodiment of the present disclosure.

FIG. 5 is a side view of a portion of an interior of a vehicle 10 equipped with an overhead airbag cushion system 500 similar in some respects to the overhead airbag cushion system 100 and having a pair of external tethers 560. The vehicle forward direction 18 and the occupant 50 are shown for reference, as well as a housing 512, an overhead airbag cushion 520, a main chamber 522, a lower chamber 526, and an extension chamber 530. A first end 562 of the first external tether 560 couples to a lateral portion 527 of the lower chamber 526 and a second end 564 of the first external tether 560 couples to a first vehicle anchor structure, such as, e.g., a roof 12 of the vehicle 10.

Prior to deployment of the overhead airbag cushion 520, the external tethers 560 may each be disposed behind a feature (e.g., a trim strip) of the vehicle 10 or behind a tear seam. During deployment of the overhead airbag cushion 520, the external tethers 560 may exit from behind the feature (e.g., the trim strip) or open and exit from the tear seam.

The second external tether 560 may be disposed at an opposite lateral side of the overhead airbag cushion 520. A first end of the second external tether 560 couples to a lateral portion of the lower chamber 526 opposite the lateral portion 527 and a second end of the second external tether 560 couples to a second vehicle anchor structure, such as, for example, the roof 12. The first vehicle anchor structure is in a different location than the second vehicle anchor structure. The external tethers 560 may provide support to assist the overhead airbag cushion 520 in resisting rotation about a y-axis of the vehicle 10 during loading of the extension chamber 530 as the occupant engages the overhead airbag cushion 520 during a collision event.

In one embodiment, the external tethers 560 may detach after a pre-configured delay (e.g., at a time when the overhead airbag cushion 520 will have at least substantially deflated following a collision event) or when an appropriate sensor determines that the vehicle 10 has to come to rest following a collision event, or upon a pre-defined triggering event (e.g., an adjacent door opens after the vehicle 10 has come to rest, etc.)

Figure 6:
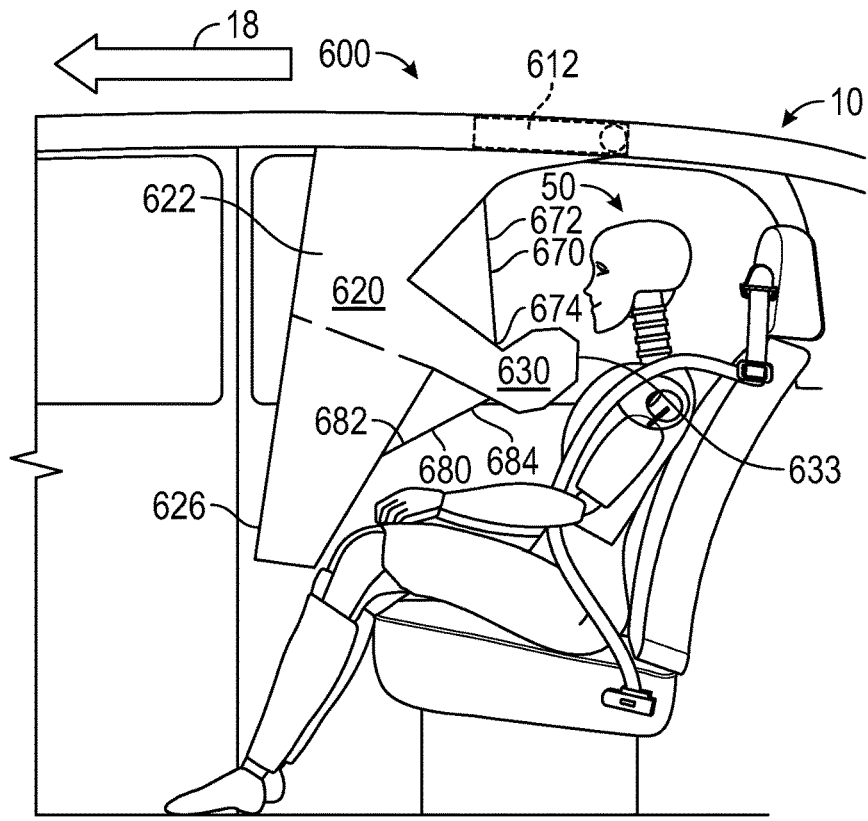
FIG. 6 is a side view of a portion of an interior of a vehicle equipped with an overhead airbag cushion system having a plurality of external tethers according to one embodiment of the present disclosure.

FIG. 6 is a side view of a portion of an interior of a vehicle 10 equipped with an overhead airbag cushion system 600 having a plurality of external tethers 670, 680. The vehicle forward direction 18 and the occupant 50 are shown for reference, an also shown are a housing 612, a main chamber 622, a lower chamber 626, and an extension chamber 630 (an elongate head chamber). A first external tether 670 comprises a first end 672 coupled to the main chamber 622 and a second end 674 coupled to the extension chamber 630 near a free end 633 of the extension chamber 630. The first external tether 670 is disposed to a lateral side of the overhead airbag cushion 620. A second external tether substantially similar to the first external tether 670 is disposed at an opposite lateral side of the overhead airbag cushion 620. These tethers may be a strap, or may be a panel (e.g., oriented in a longitudinal direction with respect to the vehicle 10). Alternatively, a single tether may be used and could be centered laterally on the cushion. This single tether may be a strap or a panel (e.g., oriented in lateral direction with respect to the vehicle 10).

A third external tether 680 comprises a first end 682 coupled to the lower chamber 626 and a second end 684 coupled to the extension chamber 630 near the free end 633 of the extension chamber 630. The third external tether 680 is disposed at a lateral side of the overhead airbag cushion 620. A fourth external tether substantially similar to the third external tether 680 is disposed at an opposite lateral side of the overhead airbag cushion 620. Alternatively, a single tether may be used and could be centered laterally on the cushion. This tether may be a fabric strap or a fabric panel.

The first and second external tethers 670 and the third and fourth external tethers 680 may assist in properly positioning the overhead airbag cushion 620 during deployment, and may further assist in supporting the extension chamber 630 during loading by the occupant 50 in a collision event.

Figure 7:
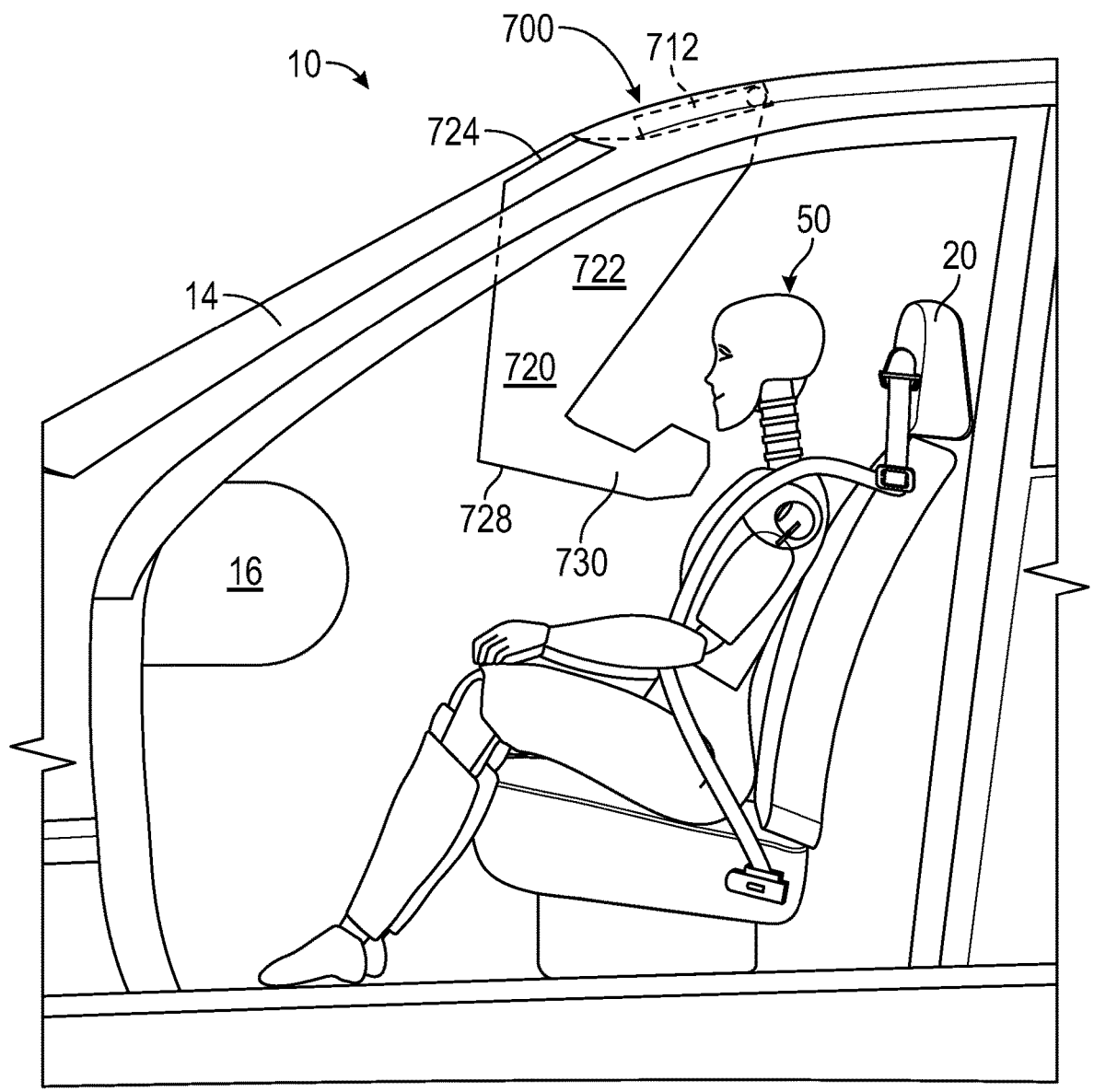
FIG. 7 is a side view of a portion of an interior of a vehicle equipped with an overhead airbag cushion system installed with a forward-facing vehicle seating position, according to one embodiment of the present disclosure.

FIG. 7 is a side view of a portion of an interior of a vehicle 10 equipped with an overhead airbag cushion system 700 that is similar in at least some respects to the overhead airbag cushion system 100 and installed for a forward facing vehicle seating position 20. The vehicle 10 comprises a roof 12 and a dashboard/instrument panel (dashboard) 16, such as in a front row of a vehicle, e.g., passenger seat. The housing 712 is disposed at the roof 12 of the vehicle 10. The overhead airbag cushion 720 is illustrated in a deployed state and at least partially inflated. In the embodiment of FIG. 7, the overhead airbag cushion 720 comprises the main chamber 722 and the extension chamber 730. A portion of the main chamber 722 provides a reaction surface 724 that is configured to engage roof 12 (or a roof structure) or the windshield 14. The reaction surface 724 provides support of the main chamber 722 to reduce potential of rotation of the main chamber 722 around a y-axis of the vehicle 10. In other words, the reaction surface 724 may provide support for the main chamber 722, and may provide support for the extension chamber 730, when an occupant 50 engages and loads the overhead airbag cushion 720 during a collision event. In one embodiment, the reaction surface 724 may engage both the roof 12 and the windshield 14 of the vehicle 10.

Figure 8:
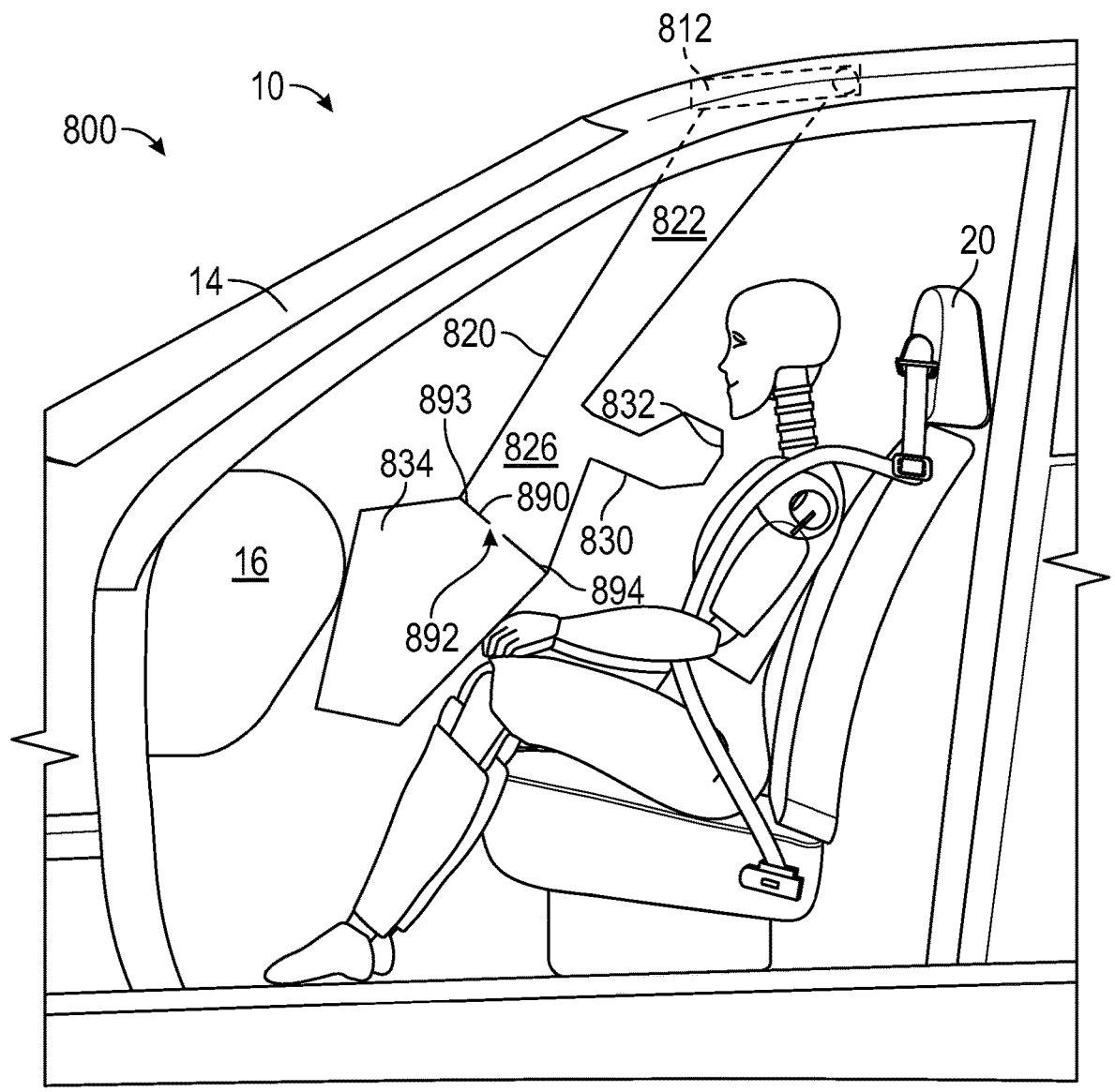
FIG. 8 is a side view of a portion of an interior of a vehicle equipped with an overhead airbag cushion system, with the overhead airbag cushion engaging a dashboard of the vehicle according to one embodiment of the present disclosure.

FIG. 8 is a side view of a portion of an interior of a vehicle 10 equipped with an overhead airbag cushion system 800 similar in at least some respects to the overhead airbag cushion system 100. The overhead airbag cushion 820 engages (or is configured to engage) the dashboard 16. The overhead airbag cushion system 800 is installed forward of the forward facing vehicle seating position 20. A roof 12 and a windshield 14 of the vehicle 10 are identified for reference, as is an occupant 50. A housing 812 of the overhead airbag cushion system 800 is disposed at the roof 12. The overhead airbag cushion 820 is shown in a deployed state and at least partially inflated.

The overhead airbag cushion 820 comprises a main chamber 822, a lower chamber 826, and an extension chamber 830. The overhead airbag cushion 820 further comprises a lower reaction chamber 834 that extends forward and/or downward from the lower chamber 826 and is configured to engage with a vehicle structure such as the dashboard 16. The overhead airbag cushion 820 also comprises an internal tether 890 separating the lower chamber 826 from the lower reaction chamber 834.

The internal tether 890 comprises a first end 893 coupled at or near an intersection of an interior surface of a forward portion of the lower chamber 826 and an interior surface of a forward portion of the lower reaction chamber 834. The internal tether 890 also comprises a second end 894 coupled at or near an intersection of an interior surface of an occupant facing portion of the lower chamber 826 and an interior surface of an occupant facing portion of the lower reaction chamber 834. The internal tether 890 may be formed as a panel of the same or substantially similar material as the overhead airbag cushion 820. The internal tether 890 may comprises a plurality of vents 892 to permit inflation gas to inflate the lower reaction chamber 834. The vents 892 of the internal tether 890 may be particularly configured to control a timing or rate of inflation of the lower reaction chamber 834.

The lower reaction chamber 834 is configured to, during a collision event, engage the dashboard 16 or other structure of the vehicle 10 so as to provide support for the overhead airbag cushion 820 as the occupant 50 engages and loads the overhead airbag cushion 820. The lower reaction chamber 834 may provide support to limit or reduce injury to the occupant 50 during a collision event, e.g., such as by preventing the occupant 50 from impacting the dashboard 16 or other structure of the vehicle 10.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Reference throughout this disclosure to "an embodiment" or "the embodiment" means that a particular feature, structure, or characteristic described in connection with the embodiment is included in at least one embodiment. These phrases, or variation thereon, as recited throughout this disclosure are not necessarily all referring to the same embodiment.

Similarly, it should be appreciated by one of ordinary skill in the art with the benefit of this disclosure that in the above description of embodiments, various features are sometimes grouped together in a single embodiment, figure, or description thereof for the purpose of streamlining the disclosure. This method of disclosure is not to be interpreted as reflecting an intention or limitation that any claim requires more features than those expressly recited in that claim. Rather, as the following claims reflect, inventive aspects lie in a combination of fewer that all features of any single foregoing disclosed embodiment. Thus, the claims below are hereby expressly incorporated into this Detailed Description, with each claim standing on its own as a separate embodiment. This disclosure includes all permutation of the independent claims with their dependent claims which may be discerned by one of ordinary skill in the art.

Those having skill in the art will appreciate that many changes may be made to the details of the above-described embodiments without departing from the underlying principles of the invention. The scope of the present invention should, therefore, be determined only by the following claims.

The invention claimed is:

1. An overhead airbag cushion comprising:
   a main chamber to receive inflation gas to expand from a packaged state above a vehicle seating position and deploy downward to be disposed forward of the vehicle seating position in a deployed state;
   an elongate head chamber that extends from the main chamber toward the vehicle seating position at an angle, the elongate head chamber defining an upper surface configured to, in a collision event, receive a head of an occupant seated in the vehicle seating position,
   wherein the elongate head chamber deflects vertically relative to the main chamber when the head of the occupant engages the elongate head chamber thereby changing the angle between the elongate head chamber and the main chamber;
   a lower chamber, wherein the extension chamber is disposed between the main chamber and the lower chamber; and
   a vertical internal panel tether that couples to a vehicle facing portion of the main chamber and to an occupant facing portion of the main chamber, wherein the vertical internal panel tether comprises a planar surface arranged vertically within the overhead airbag cushion in the deployed state, and wherein the vertical internal panel tether extends across a first opening between the main chamber and the elongate head chamber and across a second opening between the main chamber and the lower chamber.

2. The overhead airbag cushion of claim 1, wherein a free end of the elongate head chamber comprises an upward projection.

3. The overhead airbag cushion of claim 1, wherein the elongate head chamber deflects vertically downward.

4. The overhead airbag cushion of claim 1, wherein a portion of the main chamber provides a reaction surface that is configured to engage one of a vehicle roof structure and a windshield.

5. The overhead airbag cushion of claim 1, further comprising a second internal tether that extends from an occupant facing portion of the main chamber to a vehicle facing portion of the main chamber.

6. The overhead airbag cushion of claim 1, wherein the lower chamber is partially inflatable.

7. The overhead airbag cushion of claim 1, further comprising an internal tether that extends from an occupant facing portion of the airbag cushion to a vehicle facing portion of the airbag cushion and disposed between the main chamber and the lower chamber,
   wherein the internal tether comprises a plurality of internal vents.

8. The overhead airbag cushion of claim 1, further comprising:

an external tether with a first end coupled to a first lateral side of the lower chamber and a second end coupled to a first vehicle structure; and a second external tether with a first end coupled to a second lateral side of the lower chamber and a second end coupled to a second vehicle structure.

9. The overhead airbag cushion of claim 1, further comprising an external tether with a first end coupled to the lower chamber and a second end coupled to the elongate head chamber near a free end of the elongate head chamber.

10. The overhead airbag cushion of claim 1, wherein the vertical internal panel tether couples to a vehicle facing portion of the main chamber and the lower chamber and to an occupant facing portion of the main chamber and the lower chamber, wherein the vertical internal panel tether controls a geometry of the airbag cushion upon deployment.

11. The overhead airbag cushion of claim 1, further comprising a lower reaction chamber that extends from the lower chamber away from the occupant and is configured to engage with a vehicle structure.

12. The overhead airbag cushion of claim 11, further comprising a second internal tether separating the lower chamber from the lower reaction chamber, the internal tether comprising a plurality of vents.

13. The overhead airbag cushion of claim 1, further comprising an external tether with a first end coupled to the main chamber and a second end coupled to the elongate head chamber near a free end of the elongate head chamber.

14. The overhead airbag cushion of claim 1, wherein the elongate head chamber defines a rearward surface to receive the occupant seated in the vehicle seating position, and
wherein the elongate head chamber defines a bottom surface to receive a rearward facing infant car seat.

15. An overhead airbag assembly comprising:
a housing to be coupled to a roof structure of a vehicle; an inflator;
an airbag cushion configured to deploy from the housing with inflation gas from the inflator and expand from a packaged state to a deployed state disposed forward of a vehicle seating position;
a main chamber with a first end adjacent to the housing and a second end;
an extension chamber that extends away from the main chamber at the second end toward the vehicle seating position, the extension chamber configured to deflect relative to the main chamber in a vertical direction, the main chamber and the extension chamber defining a cavity to receive a head of an occupant seated in the vehicle seating position during a collision event;
a lower chamber, wherein the extension chamber is disposed between the main chamber and the lower chamber,
wherein a portion of the main chamber provides a reaction surface that is configured to engage a structure of the vehicle to reduce rotation of the airbag cushion about a y-axis of the vehicle during occupant loading; and
a vertical internal panel tether that couples to a vehicle facing portion of the main chamber and to an occupant facing portion of the main chamber, wherein the vertical internal panel tether comprises a planar surface arranged vertically within the overhead airbag cushion in the deployed state, and wherein the vertical internal panel tether extends across a first opening between the main chamber and the extension chamber and across a second opening between the main chamber and the lower chamber.

16. The overhead airbag assembly of claim 15, wherein the lower chamber and the extension chamber define a second cavity to receive a lower body of the occupant.

17. The overhead airbag assembly of claim 15, further comprising an internal tether that extends from a vehicle facing portion of the airbag cushion to an occupant facing portion of the airbag cushion and is disposed between the main chamber and the lower chamber,
wherein the internal tether comprises a plurality of vents.

18. The overhead airbag assembly of claim 15, further comprising:
a first external tether with a first end coupled to a first lateral side of the lower chamber and the second end coupled to a first anchor vehicle structure; and
a second external tether with a first end coupled to a second lateral side of the lower chamber and a second end coupled to a second anchor vehicle structure.

19. An overhead airbag cushion comprising:
a main chamber to receive inflation gas to expand from a packaged state above a vehicle seating position and deploy downward to be disposed forward of the vehicle seating position in a deployed state;
an elongate head chamber that extends from the main chamber toward the vehicle seating position at an angle, the elongate head chamber defining an upper surface configured to, in a collision event, receive a head of an occupant seated in the vehicle seating position,
wherein the elongate head chamber deflects vertically relative to the main chamber when the head of the occupant engages the elongate head chamber thereby changing the angle between the elongate head chamber and the main chamber; and
a vertical internal panel tether that couples to a vehicle facing portion of the main chamber and to an occupant facing portion of the main chamber, the vertical internal panel extending across an opening between the main chamber and the elongate head chamber, wherein the vertical internal panel tether is parallel to a plane defined by a front-rear axis of the vehicle seating position and a vertical axis.

* * * * *